US011984104B2

(12) United States Patent
Perry

(10) Patent No.: US 11,984,104 B2
(45) Date of Patent: May 14, 2024

(54) ELECTRIC BOWED STRING INSTRUMENT

(71) Applicant: Geoffrey Fitzhugh Perry, Melrose, FL (US)

(72) Inventor: Geoffrey Fitzhugh Perry, Melrose, FL (US)

( * ) Notice: Subject to any disclaimer, the term of this patent is extended or adjusted under 35 U.S.C. 154(b) by 530 days.

(21) Appl. No.: 17/214,618

(22) Filed: Mar. 26, 2021

(65) Prior Publication Data

US 2021/0304719 A1 Sep. 30, 2021

Related U.S. Application Data

(60) Provisional application No. 63/000,714, filed on Mar. 27, 2020.

(51) Int. Cl.
*G10H 3/18* (2006.01)
*G10D 1/02* (2006.01)
*G10H 1/00* (2006.01)
*G10H 1/32* (2006.01)
*G10H 1/46* (2006.01)

(52) U.S. Cl.
CPC ............... *G10H 3/182* (2013.01); *G10D 1/02* (2013.01); *G10H 1/0008* (2013.01); *G10H 1/32* (2013.01); *G10H 1/46* (2013.01); *G10H 2220/461* (2013.01)

(58) Field of Classification Search
CPC ........ G10H 3/182; G10H 1/0008; G10H 1/32; G10H 1/46; G10H 2220/461; G10D 1/02
USPC ............................................................ 84/726
See application file for complete search history.

(56) References Cited

U.S. PATENT DOCUMENTS 2,130,174 A * 9/1938 Beauchamp ........... G10H 3/181 84/727
2,764,052 A * 9/1956 McBride ................ G10H 3/181 322/3
3,003,382 A * 10/1961 Fender ................... G10H 3/185 84/727
3,733,425 A * 5/1973 Chaki .................... G10H 3/146 84/DIG. 24
4,051,761 A * 10/1977 Nylen .................... G10H 3/181 984/368
4,378,722 A * 4/1983 Isakson .................. G10H 3/185 984/371

(Continued)

FOREIGN PATENT DOCUMENTS

CA 2873012 A1 * 6/2015 ............. G10H 3/143
CN 208752943 U * 4/2019 ............. G10D 1/085

*Primary Examiner* — Christina M Schreiber
(74) *Attorney, Agent, or Firm* — Jose A. Medina-Cruz

(57) ABSTRACT

According to an aspect of the present invention, there is an electric violin comprising a sound bar having a first tang and a second tang. The central portion of the sound bar rests on a top plate of the violin, separated by a separator pad, and the first and second tangs protrude to an inner cavity of the violin through a first and a second plate hole of the top plate. A pickup assembly includes a first and a second pickup, where each of the pickups comprise a bobbin made of two plates separated by a plurality of magnetic polepieces and surrounded by a coil wire. Each of the pickups includes a compression mechanism including a height adjustment screw that holds the compression mechanism at a firm tension while the distance between the plurality of the magnetic polepieces of the pickup and the corresponding tang satisfies a tolerance gap.

19 Claims, 8 Drawing Sheets

(56) References Cited

U.S. PATENT DOCUMENTS

| | | | | | |
|---|---|---|---|---|---|
| 4,567,805 | A * | 2/1986 | Clevinger | G10H 3/185 | 84/DIG. 24 |
| 4,919,033 | A * | 4/1990 | Markov | G10H 3/18 | 984/367 |
| 5,206,449 | A * | 4/1993 | McClish | G10H 3/182 | 84/723 |
| 5,229,537 | A * | 7/1993 | Kennedy | G10H 3/185 | 84/727 |
| 7,138,577 | B2 * | 11/2006 | Takabayashi | G10H 3/185 | 84/730 |
| 8,319,088 | B1 * | 11/2012 | Harari | G10H 3/181 | 84/727 |
| 9,495,948 | B2 * | 11/2016 | Patrick | G10H 3/143 | |
| 10,068,559 | B2 * | 9/2018 | Kober | G10H 3/181 | |
| 10,777,171 | B1 * | 9/2020 | Tiene | G10D 1/085 | |
| 2006/0117938 | A1 * | 6/2006 | Gillette | G10H 3/186 | 84/723 |
| 2007/0084335 | A1 * | 4/2007 | Silzel | G10H 3/146 | 84/723 |
| 2016/0027422 | A1 * | 1/2016 | Baker | G10D 1/085 | 84/726 |
| 2017/0076706 | A1 * | 3/2017 | Patrick | G10H 3/181 | |
| 2021/0304719 | A1 * | 9/2021 | Perry | G10H 3/182 | |

* cited by examiner

ELECTRIC BOWED STRING INSTRUMENT

BACKGROUND

The present invention relates generally to the field of electric bowed instruments, and more particularly to magnetic pickups for electric violin that produce improved, clear, articulate, and dynamic sound usable with almost any amplifier currently on the market without the need for additional pre-amps or specialized tone shaping devices.

A magnetic pickup is a transducer consisting of one or more magnets, such as alnico or other ferrous material, wrapped with a coil of several thousand turns of coil wire. The magnets capture the sound in a musical instrument by creating a magnetic field that interacts with a magnetized portion of the musical instrument, such as the strings or a metallic sound bar in the instrument. For instance, when a guitar string is plucked, the magnetic field moves with the string. This movement then induces a current in the coil of the pickup that can be amplified through an instrument amplifier or a public address (PA) system.

The present invention is directed to a novel dual magnetic pickup system especially suited for electric bowed string instruments such as the violin, the viola, the cello, or the double bass.

SUMMARY

According to an aspect of the present invention, there is an electric violin comprising a sound bar that includes a first tang and a second tang. The first tang and the second tang are bent at an angle from a central portion of the sound bar such that the central portion of the sound bar rests on a violin top plate. A separator pad separates the central portion of the sound bar and the violin top plate. In some embodiments, the separator pad is a rubber pad, a cork pad, or a leather pad. The first tang and the second tang protrude into an inner cavity of the violin body through a first plate hole and a second plate hole in the violin top plate.

The present invention further includes a pickup assembly comprising a first pickup and a second pickup. Each of the pickups comprise a bobbin made of two plates separated by a plurality of magnetic polepieces and surrounded by a coil wire. However, the pickups have different amounts of coil wire and therefore they both produce different tonal qualities.

Each of the pickups comprises a compression mechanism having height adjustment screws holding the compression mechanism at a firm tension at a distance that satisfies a tolerance gap between the corresponding plurality of magnetic polepieces and the corresponding tang.

The present invention further includes a pickup selector switch having at least three positions: (i) a first position that outputs sound from the first pickup, (ii) a second position that outputs sound from the second pickup, and (iii) a third position that outputs sound from the combination of the first pickup and the second pickup.

The present invention may further include a master volume control comprising a master volume knob located on an upper left bout of the electric violin and perpendicular to a neck of the electric violin with a rotational axis pointed towards the top plate and a back plate of the electric violin.

In the present invention, the compression mechanism may comprise a compression gasket that is made of rubber or gel (e.g., a silicone gel or silicone rubber gel). In other embodiments, the compression mechanism may comprise a compression spring. The compression mechanism may be mechanically attached to the top plate of the electric violin by the height adjustment screw and one or more spacers. The compression mechanism may alternatively be mechanically attached to the back plate of the electric violin by the height adjustment screw and one or more spacers.

In some embodiments, the first pickup and the second pickup produce different tonal qualities based on: (i) the difference of the height of the first pickup and the height of the second pickup, and (ii) the difference in a first amount of coil wire corresponding to the first pickup and a second amount of coil wire corresponding to the second pickup, and the contours of various coil winding techniques.

DETAILED DESCRIPTION

Figure 1A:
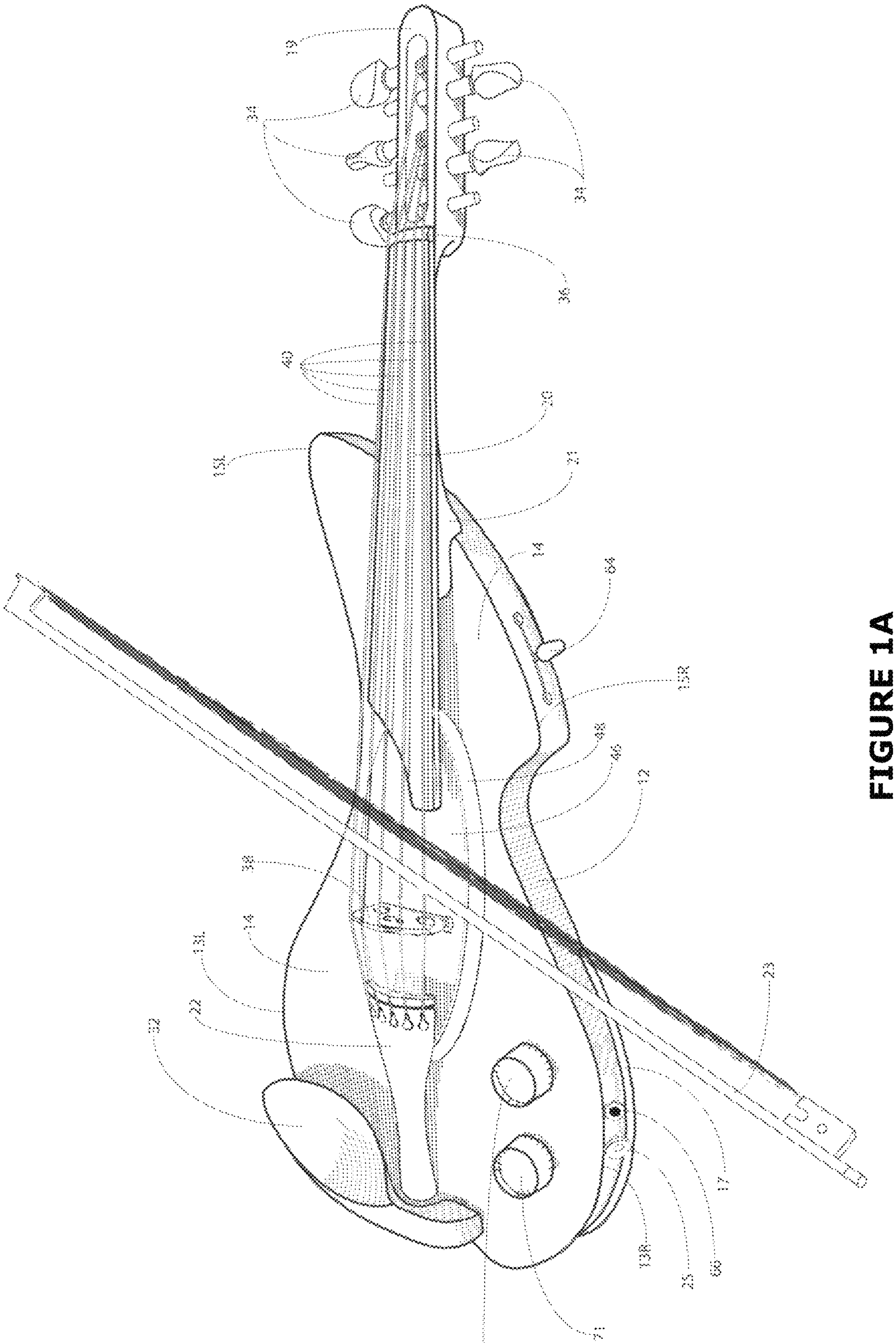
FIG. 1A is a top perspective of an electric violin according to the present invention.

The present invention is directed to magnetic pickup systems especially suited for electric bowed string instruments, such as the violin, that produces improved, clear, articulate, and dynamic sound, more so than almost all previous art while also having increased tonal options through its multiple magnetic coil based electronics that can be amplified through almost any amplifier currently on the market without the need for additional pre-amps or specialized tone shaping devices. These advantages help the violin to compete in output strength and tonal options with other popular instruments such as the electric guitar.

Magnetic pickups bring a more dynamic and open sound as compared to piezo pickup based systems currently available on most electric violins. Piezo pickups do not produce as pleasing of a musical sound when amplified, often sounding more brittle, harsh, and compressed to the listener's ear. Magnetic pickups can produce a much fuller and richly dynamic musical tone when paired with a guitar amplifier distortion or effect pedal circuit. The embodiments shown herein especially allow for a more pleasing tone when using over-gain or distortion settings on amplifiers and effect pedals as commonly used in instruments such as the electric guitar. Similarly, the unique positioning of the master volume knob and pickup selector switch allows for quicker and more ergonomic use for the player as housed in the exemplary embodiment. Therefore, the present invention can squarely bring the electric violin competitively into the electric guitar arena, opening many more musical possibilities than previous designs.

The advantages the present invention can be summarized as follows:

Use of multiple pickups: All the same sonic advantages of the electric guitar that include various tonal options of multiple pickups used singularly and in combination (as selected by a pickup selector switch), and onboard circuitry to further shape the sound and its playability through any available guitar amplifier or PA speaker system currently on the market.

Improved output and tone: The present invention also improves the output to match that of today's electric guitars, so that the amplifier can be musically driven, just like a guitar, into musical realms of distortion with much more pleasing tone over previous piezo-based pickup systems. This further opens up more sound options for violinists and gives them more possibilities to express themselves musically.

No special strings necessary: Since the magnetic coils in the present invention are not near or intended to be direct string vibration sensors as in many previous art examples, any available string the player might prefer can now be used, in contrast to special strings having more ferrous metal content being needed for under-string magnetic pickup designs in previous art.

Tonal quality influenced by materials: Contrary to the majority of available instruments where the pickup is more isolated from the body, also has the tonal advantage of being sensitive enough to be still influenced by the totality of the materials it is made of (various varieties of wood, carbon fiber, 3D printing, and metal, are all possibilities). This allows for subtle manufacturing variations that can affect the overall tone and playability of the instrument as preferred by the player.

This Detailed Description section is divided into the following sub-sections: (i) The General Environment; (ii) Example Embodiment; (iii) Further Comments and/or Embodiments; and (iv) Definitions.

I. THE GENERAL ENVIRONMENT

The present invention may be an electric bowed instrument. The electric bowed instrument includes two or more magnetic pickups that produce improved, clear, articulate, and dynamic sound as compared with the state of the art. Although this disclosure may refer to exemplary embodiments of an electric violin, it is understood that the same principles apply to other electric bowed instruments such as the viola or the cello.

Figure 1B:
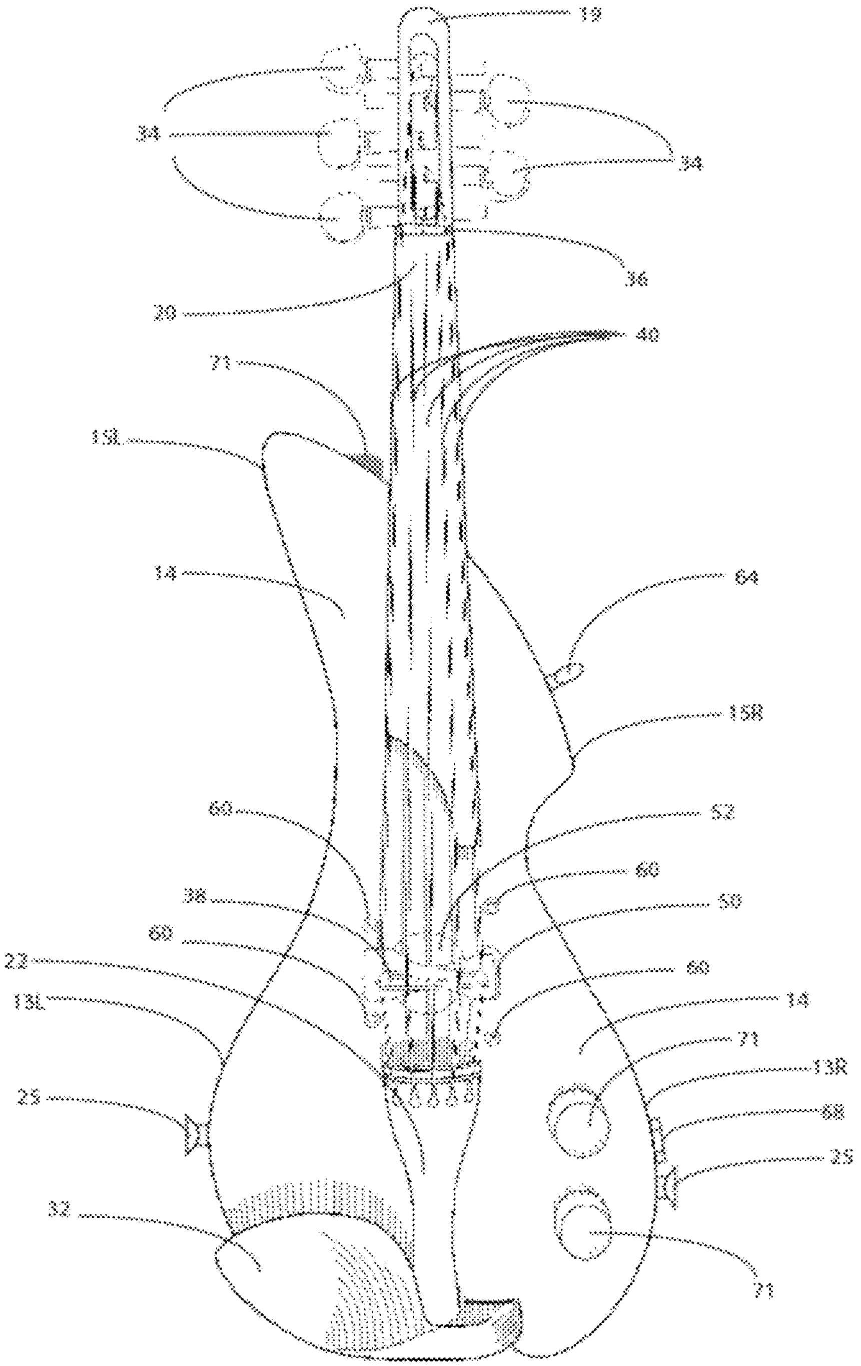
FIG. 1B is a top view of an electric violin according to the present invention.

Addressing the present invention generally in relation to FIGS. 1A and 1B, a musician operates an electric violin according to the present invention in a manner similar to other electric instruments such as the electric guitar or the electric bass. The musician plugs a cable (e.g., a standard mono ¼" instrument cable) into an output jack 66 of the electric violin and also plugs the opposing cable end into any standard guitar amplifier or public address (PA) speaker system, mixer input, or wireless transmitter (not shown), so the output signal will then be amplified through a magnetic speaker enclosure. The musician may also plug analog or digital effects units between the electric violin and the amplifier (or through an effects loop circuit in the amplifier) to alter the sound of the instrument through audio signal processing. Effects units typically used in popular music include effects like EQ, distortion, dynamics, filter, modulation, pitch/frequency, delay, reverb, spatial effects, and feedback/sustain effects, among others. Musicians use these effects units in various formats including stomp boxes, rack units, multi-effects units, digital audio workstation plugins, and built-in amplifier effects.

Direct operation would then commence as any other standard acoustic or electric bowed string instrument by drawing a standard bow 23 over the strings 40 of the electric violin and creating friction with the aid of any available bow rosin on the bow's hairs to excite the strings 40 into vibration.

Figure 2A:
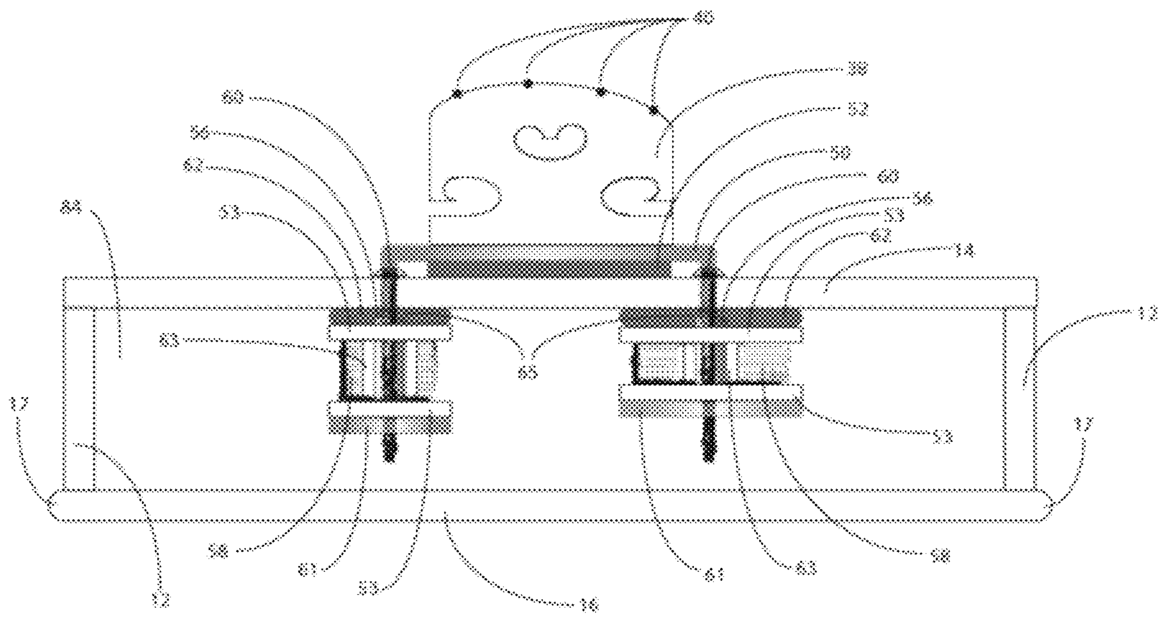
FIG. 2A is a cross-section lower bout view showing the inner body cavity of an electric violin according to the present invention.
Figure 2B:
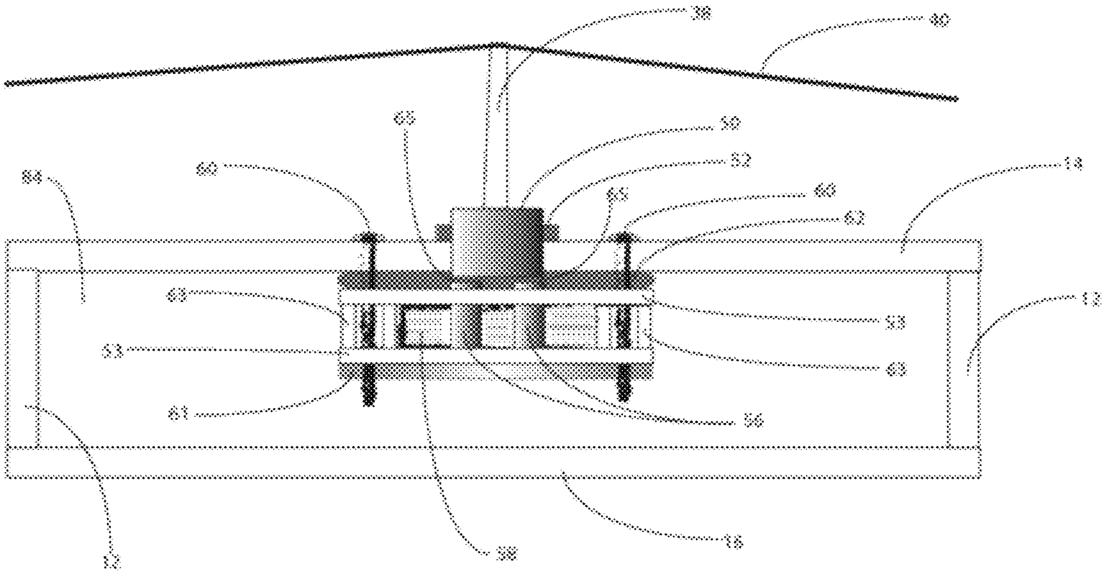
FIG. 2B is a cross-section left-side view from a perspective of the lower bout showing the inner body cavity of an electric violin according to the present invention.
Figure 2C:
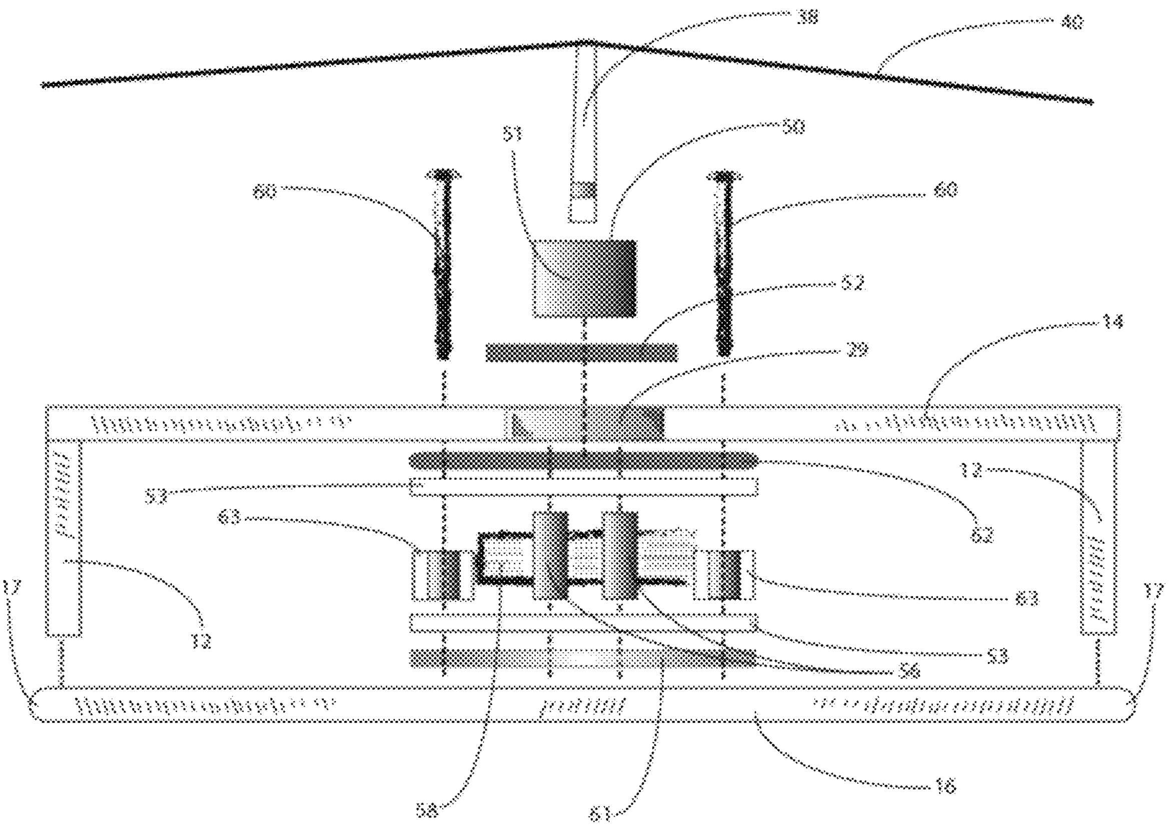
FIG. 2C is an exploded side view of the pickup assembly according to the present invention.

Referring to FIGS. 2A, 2B, and 2C, the vibration created is transferred though the bridge 38 and in turn transferred into the ferrous metal sound bar 50 that the bridge is seated on, vibrating both end tangs 51L and 51R of the sound bar 50 to create interference between the magnetic fields of the pickup coil assembly 76 and the magnetic polepieces 56 within a tolerance gap 65. The preferred tolerance gap 65 between end of tangs 51 and the top of the corresponding magnetic polepieces 56 is anywhere from 1/32" to 3/16" with this clearance being adjusted as needed by use of height adjustment screws 60 of each pickup coil assembly 76L, 76R and compression gasket 62. The tangs 51 can also rest in direct contact with the polepieces 56 and still produce a signal, but output and preferred tone is much reduced in this case.

Continuing, as vibrating sound bar 50 creates interference in the magnetic field of the pickup coil assembly 76, the signal is sent down wires connected to the pickup selector switch 64, tone circuits 72, and master volume control 71, before exiting the output jack 66 on the way to the chosen amplifier.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

FIG. 1A shows a perspective view of the violin in its preferred embodiment showing the outer body assembly with attached neck assembly, pickup assembly and various externally visible parts. FIG. 1B shows a top view of an electric violin without pickup cover 46. In an exemplary embodiment, all contact points to the players body are the same dimensions as a standard Cremona era violin, which includes the playable string scale length (nut 68 to bridge 38), body length (end button 26 to neck joint 21), overall length (end button 26 through headstock/pegbox 19) and depth of body cavity 84 and side rib 12 wall height (though thinner profiles are also an option). In some embodiments, the electric violin includes strap buttons 25 and violin strap 27 to secure the electric violin to the body of the player.

In an exemplary embodiment, neck 18 features a traditional bowed instrument fretless fingerboard 20. In other embodiments, fingerboard 20 may include frets (not shown) to provide absolute pitch, a feature that is useful in loud live music settings. In yet other embodiments, fingerboard 20 may include inlaid semi-frets (not shown) that serve as visual pitch guides for the player.

Figure 1C:
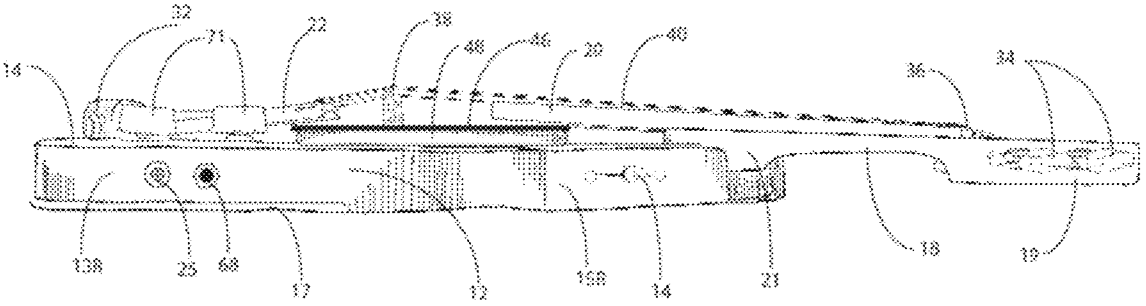
FIG. 1C shows a left-side view of an electric violin according to the present invention.

FIG. 1C is a left-side view of the assembled violin showing the body, neck assembly and placement of the pickup assembly, pickup cover 46 and isolation spacer 48 with bridge 38 protruding through slots cut in both the pickup cover 46 and isolation spacer 48, and strings 40 tightened from tuning pegs 34 to tailpiece 22. Also in view is the master volume knob 71, output jack 66, tailpiece hanger 28 and end button 26. Also shown is an optional chin rest 32.

Figure 1D:
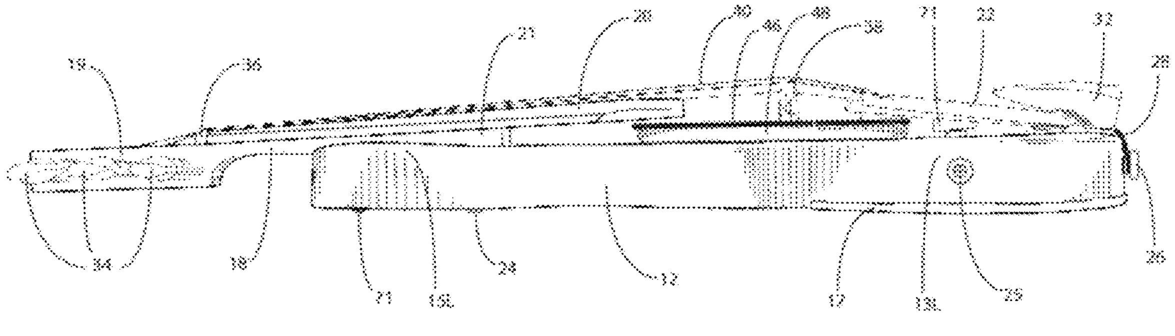
FIG. 1D shows a right-side view of an electric violin according to the present invention.

FIG. 1D shows the right-side view of the body assembly and neck assembly, and all the shared parts from FIG. 1C, but also shows the preferred placement of the pickup selector switch 64 as well as placement of the two-tone knobs 71.

FIG. 2A shows a cross-section lower bout view of the pickup assembly. FIG. 2B shows a cross-section left-side view showing the inner body cavity 84. FIG. 2C shows an exploded view of the pickup assembly. These views show first and second pickup coil assembly 76, separator pad 52, metal sound bar 50, and bridge 38. These views also show bridge 38 resting, upright by pressure from taut strings 40, on the sound bar 50 made of ferrous metal such as steel, with dual tangs or bends 51 at each end (L/R) protruding through top plate tang hole 29 cut in the violin top plate 14. Also included in these views is a compression mechanism 59 having a compression gasket 62 for each pickup, two spacers 63 between the top and bottom bobbin plates 53 for each pick up, and aluminum base plates 61 with threaded holes to match the pickup height adjustment screws 60 and allow for the mechanical attachment of the pickup assembly into the compression gasket 62 pressed against the underside of the instrument top plate 14.

As shown in these figures, the sound bar 50 is separated from the top plate 14 by a separator pad 52. The preferred material for the pad is rubber, but could also be cork, leather, or other materials. In this exemplary embodiment, pickup coil assembly 76 includes a first magnetic pickup 76L and a second magnetic pickup 76R. The magnetic pickups may also be referred to as bobbin assemblies or pickup assemblies. Each of the magnetic pickups 76L, 76R consists of bobbins made of two plates 53 separated by two or more magnetic polepieces 56 and surrounded by a coil of wire in various amounts to produce the desired tonal qualities and outputs. In this exemplary embodiment, the first magnetic pickup 76L and the second magnetic pickup 76R have different configurations. Contrary to multi-pickup designs in electric instruments (e.g., electric guitar or electric bass), which may take the tonal qualities of the position of the pickup with respect to the where the pickup is located along the length of the string (e.g., close to the bridge or further away from it), the first magnetic pickup 76L and the second magnetic pickup 76R produce distinct sounds based on the configuration of each of the magnetic pickups 76L, 76R. For example, the first magnetic pickup 76L may include a shorter pickup coil and the second magnetic pickup 76R may include a taller coil.

In general terms, a standard guitar pickup includes a coil of between 6,000 and 9,000 winds with a material such as 42-gauge insulated wire. Magnetic pickups in accordance to the present invention include about two-and-a-half times the number of winds as compared to a standard guitar pickup. To further enhance the tonal differences between the first magnetic pickup 76L and the second magnetic pickup 76R, the number of winds comparatively between each pickup can also vary by as much as 20%.

FIGS. 2A, 2B, and 2C further show a compression mechanism 59 for pickup coil assembly 76. For example, the user may adjust the height of each of the pickup coil assembly 76 with height adjustment screws 60 coming into the inner body cavity 84 through the top plate 14 with compression mechanism 59 pulling the pickup coil assembly 76 upward by threading into aluminum plates 63 and increasing the tension of compression gasket 62. When the compression mechanism 59 achieves a firm tension, magnetic polepieces 56 are within a tolerance gap 65 of the sound bar tangs 51, which allow the vibrations of the sound bar 50 as coupled with the bridge 38 and strings 40 as they are played with a bow 23 or plucked.

Pickup height adjustment screws 60 mechanically attach the compression mechanism 59 to the instrument top plate 14 by screwing into aluminum base plates 61. Aluminum base plates 61 may include an open screw hole or a threaded insert for engagement with height adjustment screws 60. Tightening height adjustment screws 60 increases the tension of the compression gasket 62 pulling the compression mechanism 59 towards the instrument top plate 14. Tension is adjusted until the compression mechanism 59 is firmly attached to the instrument top plate 14 and the distance of the magnetic polepieces 56 and the sound bar tangs 51 satisfies a tolerance gap 65. Bobbin spacers 63 serve to counteract unwanted flexing of the pickup bobbin materials.

Threaded tension plate 61 should be made of a material strong enough to withstand the pressure of the compression gasket 62 without stripping its threads as they match the height adjustment screws 60. Threaded tension plate 61 should be made of non-ferrous material to avoid negative effects on the currents of the magnetized portions of the magnetic polepieces 56 and coils.

In some embodiments, the tolerance gap 65 is satisfied by the height adjustment screws 60 increasing the tension of the compression mechanism 59 until the plurality of magnetic polepieces 56 of the pickups are near, but not touching, the tang 51. The preferred tolerance gap 65 between end of tangs 51 and the top of the corresponding magnetic polepieces 56 is anywhere from 1/32" to 3/16" with this clearance being adjusted as needed by use of height adjustment screws 60 of each pickup coil assembly 76L, 76R and compression mechanism 59. Placing the magnetic polepieces 56 within a tolerance gap 65 of the tang 51 makes the polepieces 56 sensitive to the vibration of the sound bar 50, therefore being able to pick up the sound produced by the violin.

If the pickup is installed from the back plate 16, a compression mechanism 59 including a compression spring or a silicone gel gasket may push the pickup towards the top plate 14, being limited by the screw, therefore achieving the desired tolerance gap 65 between the polepieces 56 and the tang 51. If the pickup is installed from the top plate 14, the compression mechanism 59 may pull the pickup against the compression gasket 62 by increasing the tension with the height adjustment screws 60, therefore adjusting the tolerance gap 65 and keeping them consistent. In the preferred embodiment, the pickup is installed from the top plate 14 and height adjustment screws 60 pull the pickup against a compression gasket 62 that enables the desired tolerance gap 65 while keeping the pickup securely in place.

In some embodiments, the compression gasket 62 can be replaced by any other compression mechanism 59 that allows the height adjustment screw to adjust the distance of the pickup within a tolerance gap 65 from the corresponding tang 51. Suitable materials include a rubber compression gasket, a silicone gel gasket, or a compression spring. Materials that may be used in compression mechanism 59 include any material that opposes compression, such as compression springs that oppose compression along the axis of wind. Using a compression gasket 62 made of rubber mechanically attached to the top plate 14 of the electric violin is preferred because of the ability of the material to reduce rattling sounds and other noise. Other configurations of the pickup coil assembly 76 are discussed in Section III below.

FIGS. 2A and 2C also show the back plate protrusions 17 on each side that extend slightly out past the edge of the side ribs 12 in the left and right lower bouts 13 for attachment of an optional shoulder rest (not shown) that are readily available in various qualities, sizes and designs.

Figure 3:
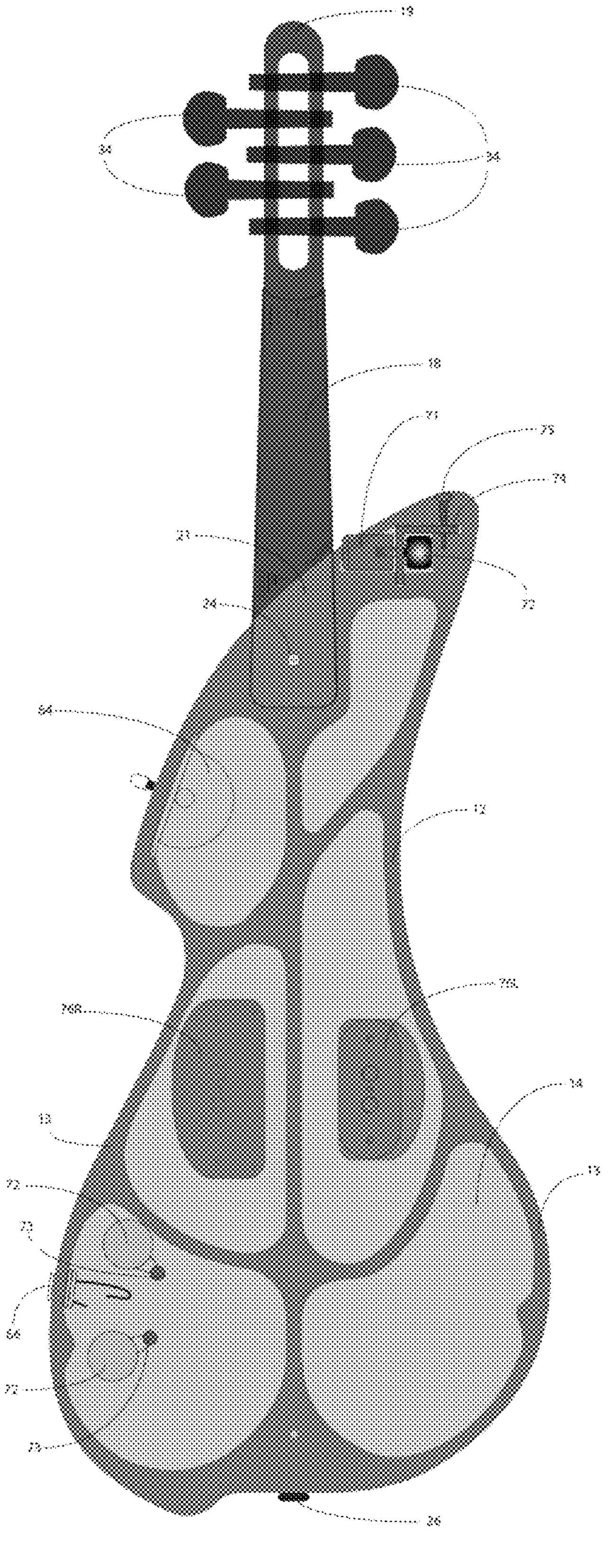
FIG. 3 shows a back view of the electric violin having the back plate removed and showing an internal arrangement of parts in the inner body cavity according to the present invention.

FIG. 3 shows the preferred internal arrangement of parts in the body cavity 84 with the back plate 16 removed. This view shows the inner shaping of the side ribs 12 and how they can accommodate all the electronic components. Shown are the placement of the pickup coil assembly 76, two tone potentiometers 72, one for each pickup 76L, 76R, each including a filtering capacitor 73, a pickup selector switch 64, a master volume control 71 and an output jack 66.

In this exemplary embodiment, the pickup selector switch 64 is actionable by the user to select one of the magnetic pickups 76L, 76R or the combination of magnetic pickups 76L, 76R that produces sound at any given time. For example, a first position of the pickup selector switch 64 selects the first magnetic pickup 76L, a second position of the pickup selector switch 64 selects the second magnetic pickup 76R, and a third position of the pickup selector switch 64 selects the combination of the first magnetic pickup 76L and the second magnetic pickup 76R.

Figure 4A:
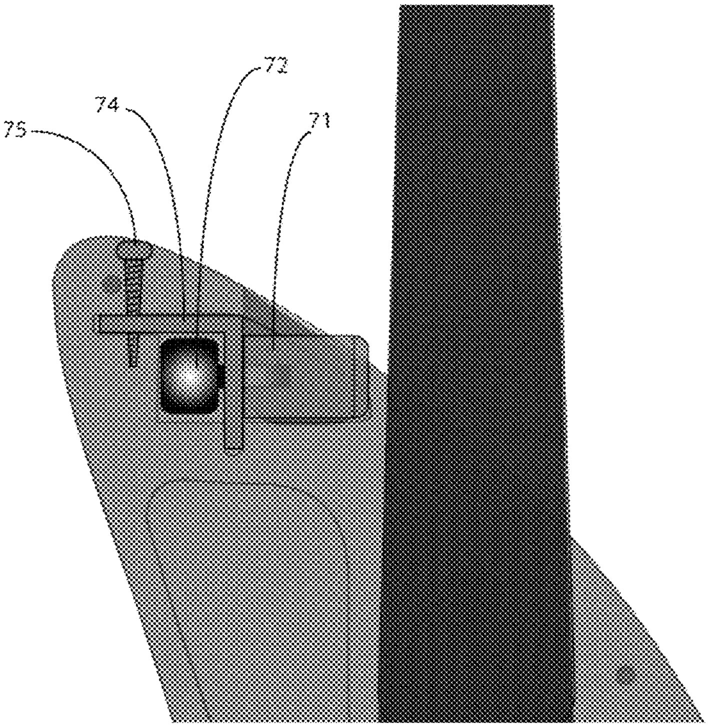
FIG. 4A shows a cross-section front view showing the master volume control of an electric violin according to the present invention.
Figure 4B:
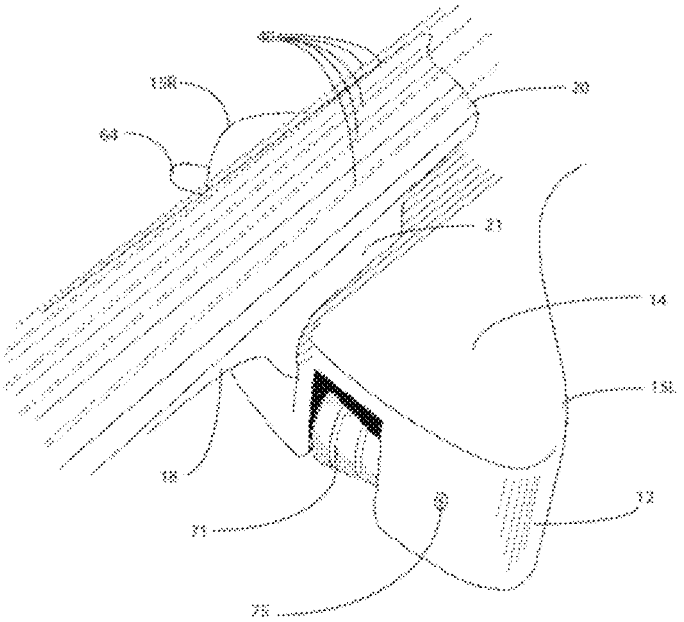
FIG. 4B shows a perspective view of the upper left bout featuring the master volume control of an electric violin according to the present invention.

FIG. 4A shows a cross-section front view showing the master volume control. FIG. 4B shows a side view of the upper left bout showing the master volume control. According to the present invention, a master volume control 71 is ergonomically placed in a body cavity 84 in the upper left bout 15L, next to the neck 18 and perpendicular to it, and with a rotational axis pointed towards the top plate 14 and the back plate 16 of the electric violin. For electric bowed instrument players, particularly electric violin and electric viola, this location allows a player's thumb to adjust the volume quickly and easily during performance. The master volume control includes a volume knob 71 that protrudes from an opening in the ribs 12 next to the neck 18. Volume knob 71 and its potentiometer 72 are held in place by a bracket 74 set into slots in the body cavity 84 and held securely in place by a screw 75 threaded into the bracket 74. Other configurations of the master volume control 71 are discussed in Section III below.

Figure 5:
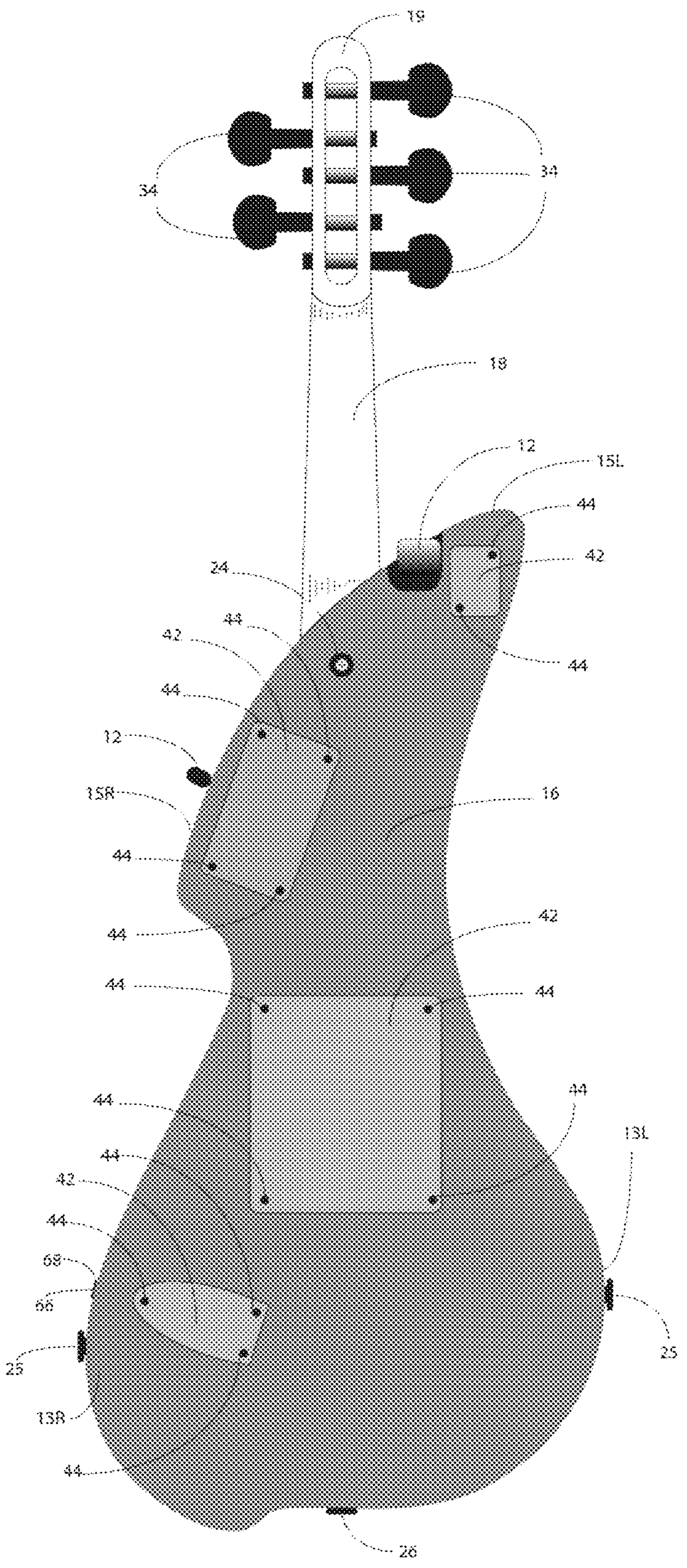
FIG. 5 shows a view of the back plate of an electric violin according to the present invention.

FIG. 5 is the back view of the assembled violin showing the back plate 16 and various body cavity 84 access covers 42 for adjustment or later repair of electronics and switching components as needed. These covers 42 can be directly screwed to the back plate 16 or be set into matching recessed depressions to be flush with the back plate 16 surface. An alternative embodiment for this purpose is a one-piece removable back plate 16 screwed onto the ribs. Also visible is the pickup selector switch 64 master volume knob 71, and end button 26, as well as the rear view of the neck 18, peg box 19, and tuning pegs 34, shown here in a five-string arrangement, though electric violins with less or more strings are also an option. This view also shows a single neck attachment screw 24, though an alternative embodiment could have multiple attachment screws as well.

III. FURTHER COMMENTS AND/OR EMBODIMENTS

The present invention addresses the unpleasant sound of piezo-based pickup systems in general, especially as it pertains to using distortion and other effects boxes, just like other instruments, like the electric guitar, enjoy with its great expressivity. Piezo elements are pressure sensing devices and work quite well in amplifying acoustic vibrations. These pressure waves cause their characteristic electronic signal but by their nature, sound "pressed" or squashed, and often produce a nasal, unpleasant tone. The present invention introduces a magnetic-based design that vibrates freely in the air, not physically touching the pickup, and works by just influencing the magnetic flux field around the pickup coil, with the resulting final tone being much more clear, dynamic, rich and pleasing.

This pleasing tone is magnified when using distortion circuitry in amps and electric effects that are readily available. The present invention produces an improved tone and is therefore better suited for high gain applications especially when coupled with overdriven tube amplifiers and distortion-based circuitry. The present invention also performs better than piezo, transducer, magnetic and other types of pickups designed for stringed instruments when coupled with analog or digital effects units.

In the present invention, sound is produced by the vibrational coupling between the magnetic polepieces 56 and the tangs 51 on the sound bar 50 when the magnetic polepieces 56 and their corresponding tang 51 are within the tolerance gap 65. When a string is excited (e.g., by plucking or bowing), the bridge 38 and the sound bar 50 produce a vibration, in unison, that in turn creates an electric signal in the pickup. The electric signal is directly affected by the vibration of the bridge 38, the sound bar 50 and its tangs 51, and, to a lesser extent, the top plate 14. Although a pickup can be mechanically coupled to the back plate 16, best results are obtained by mechanically coupling the pickup to the top plate 14 as shown in FIGS. 2A, 2B, and 3. This differs from other electric instruments where the sound is mostly affected by the vibration of a string over a magnetized polepiece, with a bridge and instrument body that only indirectly affects the electric signal generated by the pickup.

The present invention includes, in some embodiments, body cavity 84 access via removable covers 42 screwed into the back plate 16 of the instrument. These give access to all the electronic components, for adjustment or repair and replacement as needed. In some embodiments, the pickup coil assembly 76 and its height adjustment screws 60 are directly connected to and adjusted from these back cavity covers 42, so that the pickups could be removed for inspection. In yet other embodiments, the pickups may attach hanging from the top plate 14 so that they better couple with the vibrations of the whole and also could be visually inspected from behind while being used, as well as height adjusted from the top of the instrument rather than from the back, while the luthier could simultaneously be stroking the bow 23 to check the adjustments in real time.

In some embodiments of the invention, existing guitar pickups are arranged in the same manner, parallel to the strings with a sound bar that is wide enough to hover over all 6 magnetic pickup slugs/pole pieces. Advantages of this approach would include using any existing guitar pickup on the market, of which there are thousands varying in tone and output currently. The disadvantages of this approach is that guitar pickups in general are optimized to amplify the signal from a vibrating plucked guitar string, which has a much larger travel and momentum over the nature of comparatively smaller vibrations of the sound bar in the present invention, thus resulting in a diminished output as compared to the preferred embodiment.

In some embodiments of the present invention, magnetic coils are placed in other areas of the sound bar 50. The sound bar's shape may also be configured as a cross shape with 4 or more tangs 51. Advantages of this design would be more tonal options, supplied even further variations in the pickup designs using known techniques of alterations of the amount of winds in each coil or the magnetic strength and shape of each coil winding overall. Disadvantages of this design would be that the natural vibration as transferred from the bow stroke through the bridge 38 to the sound bar 50 would be favored in the natural left-to-right or side-to-side motion and not as much front-to-back on these alternative tangs. This weakness nonetheless may be counteracted in pickup design characteristics.

It should be noted that, different than an electric guitar, where by nature, musical notes can sustain and ring after plucking of the string to more easily allow a player to adjust instrument or amplifier settings on the fly during performance, a violin largely stops producing sound when the player stops bowing or plucking necessitating the need for quick changes during musical passages in performance. Referring to FIGS. 4A and 4B, master volume control 86 may be generally located on the upper left bout 15L of the electric violin. In this and other embodiments, the master volume control 71 is actuated by turning up or down at an angle perpendicular to the neck 18 allowing the user to operate the master volume control 71 with the thumb of the left hand. This is advantageous for string players, particularly in electric violin or electric viola, because it makes adjusting the volume easily accessible during performance, in contrast with electric violin models that feature knobs typically found in electric guitars and placed in traditional configurations like the top plate of the violin. These designs assume that the rhythm hand (the right hand of a right-handed player) is freely available to manipulate knobs. However, they do not account for the mechanics of a bowed instrument like the violin. In the violin, the player holds a bow 23 in their rhythm hand and therefore, this hand is inefficient in adjusting sound while playing the instrument. The master volume control 71 overcomes these challenges by a novel design and placement of the volume knob 71 for use with the hand that is most available to string players therefore placing the volume knob 71 in the most convenient, accessible, and natural spot for a string player.

Yet another possible alternative embodiment could be in the application of these designs and concepts in plucked string acoustic instruments such as the acoustic guitar. A metal sound bar 50 installed in or under a guitar's bridge or other vibrating body part, could easily incorporate any variety of magnetic pickup options in the guitar body cavity, even giving an acoustic guitar known humbucking or single coil options just like any electric guitar employs. These pickups could be used in conjunction with any other available guitar pickups, be they magnetized under-string varieties or piezo elements located in various places on the guitar, and switching circuitry could easily be added to aid the player in selecting the desired combination of all pickups involved.

Alternative body materials could be used such as carbon fiber, metal, or 3D printed from other materials that would also affect the vibration of the whole and then in turn, subtly effect the output tone and responsiveness to the player.

Other applications of this invention could be used in non-musical methods as well when used as vibration sensors, and as an alternative to piezo electric sensors, especially where there may be a need to greater variances in dynamic ranges.

The thickness, type of steel, length of tangs, and surface area of the sound bar 50 contribute to feedback reduction. A minimum surface area on the sound bar 50 that could possibly be affected by the external amplified sounds from the speaker system used helps reduce feedback (e.g., by drilling holes in the unnecessary sections of the sound bar 50). In development, single magnetic pole pickups were smaller and a bit lighter (positive for violinists in fatigue and general neck and shoulder health), but also more difficult to produce on existing pickup winding machines and had less output in general than a two-pole magnetic pickup. More magnetic pole piece pickups require a wider sound bar 50 (adding more weight and increased surface area for feedback problems) and more room in the body cavity 84. The current two-pole pickups described in Section II in relation to the Example Embodiment are advantageous to solve feedback and tone quality problems known in the art.

Considerations as to the thickness, density, and playability have been observed in relation to the separator pad. A material that is too thick may add too much to the overall height of the instrument and necessitate removing more material from a standard violin bridge to compensate. In relation to the density of the separator pad, the material should be selected to produce enough vibration in the sound bar 50 to generate a strong output and eliminate unwanted rattles. In general, the separator pad mimics the flexing of a standard acoustic violin top in the section between the traditional "f" holes and under the bridge, to have the best balance between playability and responsiveness, and also produce a strong signal and pleasing tone. Cork and leather materials produce acceptable result, but a thin layer of rubber is the best selection considering all of the above and its manufacturing availability and consistency.

As mentioned above, a two-pole pickup bobbin design provides the best alternative between weight, size, and output, as it mates with the sound bar 50 design. The amount of winds in the coil greatly effects output and tone produced as well as the shape of the coil (concave, convex, or symmetrical) and the technique in which it is wound. Since, by nature of the invention and design, the sound bar 50 produces much less actual physical movement and range of vibration amplitude than a standard plucked guitar string does, the pickup design had to allow a stronger output to compensate for this natural lack. Variations in the amount of winds of wire around the bobbin's pole pieces that brought the total winds to around twice to two-and-a-half that of today's guitar pickups were needed to produce a similar output as a standard electric guitar.

Lesser output pickups may work, but are not preferred for two main reasons: (1) mating with today's available amplifiers and electronic effects, especially in the specialized musical area of using distortion circuits, and (2) provide similar output and tone quality for performers who many want to switch instruments during performance played through the same amplifier and equipment. For example, a performer who may play violin for part of a song and then, mid-song, switch to a guitar. In this case, they would likely not have to adjust much of anything at all to do the instrument switch. In the past, piezo pickup designs, often had lower output and needed specialized externally powered electronic pre-amplifier circuits and required much external shaping of the overall tone through equalization (EQ) circuits, often requiring a complete separate system for violin than other instruments. The present invention offers playability through most guitar amplifiers on the market today with little or no tonal adjustment needed. The principles of this invention also apply to electric violins with more strings than the traditional four string violin.

Since the left and right pickup coils are receiving almost the exact vibrational signal from the bridge 38 above, through the sound bar 50, little to no difference could be heard from identical pickups on either side. This is very different from a guitar which has the advantage of placing pickups under different areas of the vibrating strings to sense or "hear" the sound as it is being produced at that portion of the string, with deeper tones being produced with pickups nearer to the neck position and brighter tones being produced with pickups nearer to the bridge position. To compensate for this natural lacking, the present invention introduces greater variations in the amount of winds in each pickup coil, and also the finished shape of the group of wire winds in each coil, with taller bobbins and thinner coils producing and slightly thinner, but clearer sound and shorter yet wider coils producing fatter, warmer and a bit darker tones. Differences can also be brought forth by shaping the wire wrapped coils in concave or convex shapes, as well as the type of alloys used in the magnetic pole pieces, such as Alnico 2 or 5. With these adjustments, pickup selector switch 64 can leverage multiple pickups with different tonal qualities to produce electric violins that are as versatile as electric guitars.

The art of pickup making is well known for certain instruments such as the guitar. However, the tonal qualities of the electric bowed instruments, like the electric violin, is not as well known as therefore requires adjustments in accordance to the present invention.

The present invention recognizes, for instance, the relative importance of the body material of an electric guitar than in an electric violin. In electric guitars, pickups are suspended by screws and springs in a hollowed-out hole in a solid wood body. Because of this, the vibration of the string itself affects the sound more than the body material does although it is recognized that the body of an electric guitar also affects how the string vibrates. The top plate of the present invention is in concert with all the other elements, though just not so directly affected by strings itself as in a guitar. This has positives and negatives that need to be balanced out in the choices of materials and design. A top plate that is thinner such as in a standard acoustic violin, does produce a more acoustic-like tone, but also has the propensity to be more negatively influenced by external sounds, especially as they increase in volume as is often the case in today's popular drum and electric guitar-based music, with the top plate picking up or entraining with these outside sounds, which could also include the amplified sound of the very violin producing it and help it to be more feedback prone. A thicker top is much less affected by outside sounds, but also has the undesirable side-effect of adding weight to the overall instrument, stressing the player's neck and shoulders negatively, and potentially making the whole less responsive. A balance between thickness and feedback rejection as to the top plate thickness gives the best overall result.

To further combat the possibility of feedback, some embodiments may include a protective cover which surrounds the base of the bridge 38, the sound bar 50, and protects the holes where the sound bar tangs 51 protrude through the tops towards the pole pieces of the pickups. This ring of foam is topped with a cover that can be made of plastic or wood that only lets the upper portion of the bridge protrude through. This isolation pad or ring and its protective cover further enhances feedback rejection and has the added visual design feature that can replace the lack of a standard arched wood top to the eye. This pickup cover can also be lined with metal foil that can help isolated the circuitry from electronic interference from overhead lighting and other negative electromagnetic influences that can produce unwanted hums and buzzes in the speaker system. In more extreme volume situations, the inner body cavity 84 can also be filled with expandable foam to further isolate the whole form outside entrainment and unwanted feedback, though this is done with a trade-off of less body resonance.

IV. PARTS LIST

The following parts list is provided in reference to the accompanying FIGS. 1-5:

Body Parts

12—side ribs
13—lower bouts (L/R)
14—top plate
15—upper bouts (L/R)
16—back plate
17—back plate edge protrusion for shoulder rest attachment
18—neck
19—pegbox/headstock
20—fingerboard
21—neck joint
22—tailpiece
23—bow
24—neck attachment screws
25—strap buttons (opt.)
26—end button
27—violin strap (opt.)
28—tailpiece hanger
29—top plate tang hole
30—shoulder rest (opt.)
32—chin rest (opt.)
34—tuning pegs
36—string nut
38—bridge
40—strings
42—cavity access covers
44—screws for cavity access and pickup covers
46—pickup cover
48—pickup cover isolation spacer
Electronic Parts
50—metal sound bar
51—sound bar tangs (L/R)
52—separator pad
53—bobbin plates
56—magnetic polepieces (slugs)
58—coil wire
59—compression mechanism
60—pickup height adjustment screws
61—threaded tension plate
62—compression gasket
63—bobbin spacer
64—pickup selector switch
65—tolerance gap
66—output jack

68—nut
71—master volume control/volume knob
72—tone and master volume potentiometers (3)
73—tone capacitor
74—master volume bracket
75—master volume bracket screw Assembly Sub-Groups

84—inner body cavity

What is claimed is:

1. An electric violin, comprising:

a sound bar comprising a first tang and a second tang, wherein the first tang and the second tang are bent at an angle from a central portion of the sound bar, the central portion of the sound bar rests on a top plate of the electric violin, the first tang and the second tang protrude to an inner cavity of the electric violin through a first plate hole and a second plate hole of the top plate, and the top plate and the sound bar is separated by a separator pad;

a pickup assembly comprising a first pickup and a second pickup, wherein the first pickup and the second pickup each comprise a bobbin made of a bobbin top plate and a bobbin back plate separated by a plurality of magnetic polepieces surrounded by a coil wire, the first pickup and the second pickup produce different tonal qualities;

the first pickup and the second pickup each comprising a compression mechanism, wherein a height adjustment screw holds the compression mechanism at a firm tension, wherein a first height between the plurality of magnetic polepieces of the first pickup and the first tang satisfies a first tolerance gap and a second height between the plurality of magnetic polepieces of the second pickup and the second tang satisfies a second tolerance gap; and a pickup selector switch comprising a first position that outputs sound from the first pickup, a second position that outputs sound from the second pickup, and a third position that outputs sound from the combination of the first pickup and the second pickup.

2. The electric violin of claim 1, further comprising:

a master volume control, wherein the master volume control comprises a master volume knob located on an upper left bout of the electric violin and perpendicular to a neck of the electric violin, wherein the rotational axis of the master volume knob points towards the top plate and a back plate of the electric violin.

3. The electric violin of claim 1, wherein the compression mechanism comprises a compression gasket.

4. The electric violin of claim 3, wherein the compression gasket is made of rubber.

5. The electric violin of claim 1, wherein the compression mechanism comprises a compression spring.

6. The electric violin of claim 1, wherein the compression mechanism is mechanically attached to the top plate of the electric violin by the height adjustment screw, a threaded plate, and one or more spacers.

7. The electric violin of claim 1, wherein the compression mechanism is mechanically attached to the back plate of the electric violin by the height adjustment screw, a threaded plate, and one or more spacers.

8. The electric violin of claim 1, wherein the first pickup and the second pickup produce different tonal qualities based on: (i) the difference of the first height and the second height, and (ii) the difference in a first amount of coil wire corresponding to the first pickup and a second amount of coil wire corresponding to the second pickup.

9. The electric violin of claim 1, wherein the separator pad is a rubber pad, a cork pad, or a leather pad.

10. An electric bowed instrument, comprising:

a sound bar comprising a first tang and a second tang, wherein the first tang and the second tang are bent at an angle from a central portion of the sound bar, the central portion of the sound bar rests on a top plate of the instrument, the first tang and the second tang protrude to an inner cavity of the instrument through a first plate hole and a second plate hole of the top plate, and the top plate and the sound bar are separated by a separator pad;

a pickup assembly comprising a first pickup and a second pickup, wherein the first pickup and the second pickup each comprise a bobbin made of a bobbin top plate and a bobbin back plate separated by a plurality of magnetic polepieces surrounded by a coil wire and the first pickup and the second pickup produce different tonal qualities;

the first pickup and the second pickup each comprising a compression mechanism, wherein a height adjustment screw holds the compression mechanism at a firm tension, wherein a first height between the plurality of magnetic polepieces of the first pickup and the first tang satisfies a first tolerance gap, and a second height between the plurality of magnetic polepieces of the second pickup and the second tang satisfies a second tolerance gap; and a pickup selector switch comprising a first position that outputs sound from the first pickup, a second position that outputs sound from the second pickup, and a third position that outputs sound from the combination of the first pickup and the second pickup.

11. The instrument of claim 10, further comprising:

a master volume control, wherein the master volume control comprises a master volume knob located on an upper left bout of the instrument and perpendicular to a neck of the instrument and the rotational axis of the master volume knob points towards the top plate and a back plate of the instrument.

12. The instrument of claim 10, wherein the compression mechanism comprises a compression gasket.

13. The instrument of claim 12, wherein the compression gasket is made of rubber.

14. The instrument of claim 10, wherein the compression mechanism comprises a compression spring.

15. The instrument of claim 10, wherein the compression mechanism is mechanically attached to the top plate of the electric violin by the height adjustment screw, a threaded plate, and one or more spacers.

16. The instrument of claim 10, wherein the compression mechanism is mechanically attached to the back plate of the electric violin by the height adjustment screw, a threaded plate, and one or more spacers.

17. The instrument of claim 10, wherein the first pickup and the second pickup produce different tonal qualities based on: (i) the difference of the first height and the second height, and (ii) the difference in a first amount of coil wire corresponding to the first pickup and a second amount of coil wire corresponding to the second pickup.

18. The instrument of claim 10, wherein the separator pad is a rubber pad, a cork pad, or a leather pad.

19. An electric bowed instrument, comprising:

a sound bar comprising a first tang and a second tang, wherein the first tang and the second tang are bent at an angle from a central portion of the sound bar, the central portion of the sound bar rests on a top plate of the instrument, the first tang and the second tang protrude to an inner cavity of the instrument through a first plate hole and a second plate hole of the top plate, the top plate and the sound bar are separated by a separator pad, and the separator pad is a rubber pad, a cork pad, or a leather pad;

a pickup assembly comprising a first pickup and a second pickup, wherein the first pickup and the second pickup each comprise a bobbin made of a bobbin top plate and a bobbin back plate separated by a plurality of magnetic polepieces surrounded by a coil wire;

the first pickup and the second pickup each comprising a compression mechanism, wherein a height adjustment screw holds the compression mechanism at a firm tension s wherein a first height between the plurality of magnetic polepieces of the first pickup and the first tang satisfies a first tolerance gap, and a second height between the plurality of magnetic polepieces of the second pickup and the second tang satisfies a second tolerance gap, the compression mechanism comprises a compression gasket, the compression mechanism is mechanically attached to the top plate of the electric violin by the height adjustment screw and one or more spacers, and the compression gasket is made of rubber, and the first pickup and the second pickup produce different tonal qualities based on: (i) the difference of the first height and the second height, and (ii) the difference in a first amount of coil wire corresponding to the first pickup and a second amount of coil wire corresponding to the second pickup;

a pickup selector switch comprising a first position that outputs sound from the first pickup, a second position that outputs sound from the second pickup, and a third position that outputs sound from the combination of the first pickup and the second pickup; and a master volume control comprising a master volume knob located on an upper left bout of the instrument and perpendicular to a neck of the instrument, wherein the rotational axis of the master volume knob points towards the top plate and a back plate of the instrument.

* * * * *